(12) United States Patent
Lin et al.

(10) Patent No.: US 9,269,017 B2
(45) Date of Patent: Feb. 23, 2016

(54) CASCADED OBJECT DETECTION

(71) Applicant: Adobe Systems Incorporated, San Jose, CA (US)

(72) Inventors: Zhe Lin, Fremont, CA (US); Jonathan W. Brandt, Santa Cruz, CA (US); Xiaohui Shen, San Jose, CA (US); Haoxiang Li, Hoboken, NJ (US)

(73) Assignee: Adobe Systems Incorporated, San Jose, CA (US)

( * ) Notice: Subject to any disclaimer, the term of this patent is extended or adjusted under 35 U.S.C. 154(b) by 79 days.

(21) Appl. No.: 14/081,577

(22) Filed: Nov. 15, 2013

(65) Prior Publication Data

US 2015/0139551 A1 May 21, 2015

(51) Int. Cl.
*G06K 9/46* (2006.01)
*G06K 9/62* (2006.01)
*G06K 9/68* (2006.01)

(52) U.S. Cl.
CPC ............ *G06K 9/4604* (2013.01); *G06K 9/6282* (2013.01); *G06K 9/6857* (2013.01)

(58) Field of Classification Search
CPC ............................ G06K 9/4604; G06K 9/6282
USPC .......................................... 382/190, 195, 226
See application file for complete search history.

(56) References Cited

U.S. PATENT DOCUMENTS

| | | | |
|---|---|---|---|
| 5,819,247 A | 10/1998 | Freund et al. | |
| 6,453,307 B1 | 9/2002 | Schapire et al. | |
| 7,024,033 B2 | 4/2006 | Li et al. | |
| 7,634,142 B1 * | 12/2009 | Bourdev | G06K 9/6282 382/181 |
| 7,769,228 B2 | 8/2010 | Bahlmann et al. | |
| 7,822,696 B2 * | 10/2010 | Zhang | G06K 9/00248 706/20 |
| 8,515,139 B1 | 8/2013 | Nechyba et al. | |
| 9,208,404 B2 | 12/2015 | Lin et al. | |
| 2003/0108244 A1 * | 6/2003 | Li | G06K 9/00228 382/227 |
| 2003/0200188 A1 | 10/2003 | Moghaddam | |
| 2008/0187213 A1 | 8/2008 | Zhang et al. | |
| 2008/0298643 A1 | 12/2008 | Lawther et al. | |
| 2008/0310737 A1 | 12/2008 | Han et al. | |
| 2009/0018981 A1 | 1/2009 | Zhang et al. | |
| 2009/0116693 A1 * | 5/2009 | Yamamoto | G06K 9/6256 382/103 |
| 2009/0125473 A1 * | 5/2009 | Amini | G06N 99/005 706/50 |
| 2010/0014758 A1 * | 1/2010 | Yano | G06K 9/00228 382/195 |
| 2010/0055654 A1 | 3/2010 | Yokono et al. | |
| 2010/0128993 A1 * | 5/2010 | Sebe | G06K 9/00228 382/224 |
| 2010/0293207 A1 * | 11/2010 | Parthasarathy | H04L 51/12 707/738 |
| 2010/0296740 A1 * | 11/2010 | Mise | G06K 9/00248 382/209 |
| 2010/0329544 A1 | 12/2010 | Sabe et al. | |
| 2011/0188737 A1 | 8/2011 | Prokhorov et al. | |
| 2012/0076408 A1 * | 3/2012 | Suk | G06K 9/3241 382/173 |

(Continued)

OTHER PUBLICATIONS

"Pre-Interview Communication", U.S. Appl. No. 14/081,489, Jul. 17, 2015, 3 pages.

(Continued)

*Primary Examiner* — Samir Ahmed
(74) *Attorney, Agent, or Firm* — Wolfe-SBMC

(57) ABSTRACT

Cascaded object detection techniques are described. In one or more implementations, cascaded coarse-to-dense object detection techniques are utilized to detect objects in images. In a first stage, coarse features are extracted from an image, and non-object regions are rejected. Then, in one or more subsequent stages, dense features are extracted from the remaining non-rejected regions of the image to detect one or more objects in the image.

20 Claims, 5 Drawing Sheets

(56) References Cited

U.S. PATENT DOCUMENTS

2012/0243734 A1* 9/2012 Greig .................. G06K 9/6257
   382/103
2015/0139538 A1 5/2015 Lin et al.

OTHER PUBLICATIONS

"Restriction Requirement", Application No. 14/081,489, Apr. 28, 2015, 6 pages.

Shen et al.,"Detecting and Aligning Faces by Image Retrieval", CVPR, 2013, pp. 4321-4328.

Zhu et al.,"Face Detection, Pose Estimation, and Landmark Localization in the Wild", 2012 IEEE Conference on Computer Vision and Pattern Recognition, 2012, 8 pages.

Schapire et al.,"Improved Boosting Algorithms Using Confidence-rated Predictions", Mach. Learn., 37(3):297-336, Dec. 1999., 40 pages.

"Notice of Allowance", U.S. Appl. No. 14/081,489, Sep. 1, 2015, 4 pages.

"Supplemental Notice of Allowance", U.S. Appl. No. 14/081,489, Nov. 10, 2015, 2 pages.

* cited by examiner

CASCADED OBJECT DETECTION

BACKGROUND

Detecting faces in uncontrolled environments continues to be a challenge for conventional face detection solutions due to the large variations in facial appearances. Conventional object detection processes often are sliding-window and model-based, and hence are limited in handling large variations in facial appearances.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

Cascaded object detection techniques are described. In one or more implementations, cascaded coarse-to-dense object detection techniques are utilized to detect objects in images. In a first stage, coarse features are extracted from an image, and non-object regions are rejected. Then, in one or more subsequent stages, dense features are extracted from the remaining non-rejected regions of the image to detect one or more objects in the image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

Some conventional object detection processes are better equipped to handle large variations in facial features, but need to extract features at all image positions and scales, making these conventional processes computationally expensive. Consider, for example, a large image with a resolution of 1500×1500. Conventional object detection processes must scan many windows in the image in order to detect different types of faces with different sizes. In order to detect a small face, such as an 18×18 face, small-scale local features must be extracted very densely. Thus, to achieve a high detection accuracy for this type of image, a large number of features must be extracted from the image, which causes conventional object detection processes to be very slow.

Cascaded object detection techniques are described. In one or more implementations, cascaded coarse-to-dense object detection techniques are utilized to detect objects in images. In a first stage, coarse features are extracted from an image, and non-object regions are rejected. Then, in one or more subsequent stages, dense features are extracted from the remaining non-rejected regions of the image to detect one or more objects in the image.

In one or more implementations, for a first stage, an image is received and features are extracted from the image. The features extracted in the first stage are coarse features. Next, an object classifier identifies, based on the extracted features, non-object regions of the image, and rejects the non-object regions of the image.

For one or more subsequent stages, additional features are extracted from the non-rejected regions of the image. The features extracted in each of the one or more subsequent stages are denser than coarse features extracted in the first stage. Next, the object classifier identifies, based on the additional extracted features, additional non-object regions of the image, and rejects the non-object regions of the image. For a final stage, the object classifier detects one or more objects in the image based on features extracted in the final stage.

Example Environment

Figure 1:
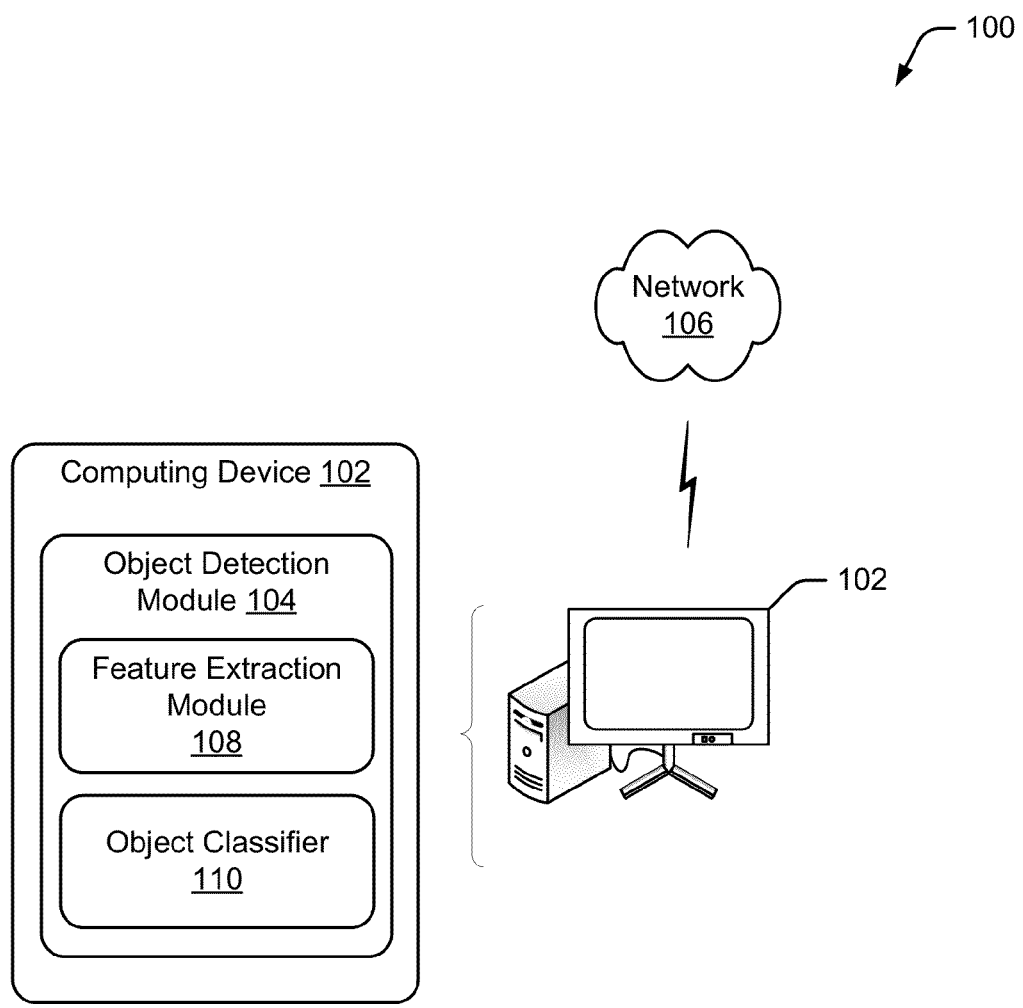
FIG. 1 illustrates an environment in an example implementation that is operable to employ techniques described herein.

FIG. 1 illustrates an environment 100 in an example implementation that is operable to employ techniques described herein. Environment 100 includes a computing device 102, which may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 5.

Computing device 102 is illustrated as including an object detection module 104. The object detection module 104 is representative of functionality to perform one or more techniques to detect objects, such as faces, in an image. Although illustrated as part of computing device 102, functionality of the object detection module may also be implemented in a distributed environment, remotely via a network 106 (e.g., "over the cloud") as further described in relation to FIG. 5, and so on.

Although network 106 is illustrated as the Internet, the network may assume a wide variety of configurations. For example, network 106 may include a wide area network (WAN), a local area network (LAN), a wireless network, a public telephone network, an intranet, and so on. Further, although a single network 106 is shown, network 106 may also be configured to include multiple networks.

An example of object detection that may be performed by the object detection module 104 is represented as a feature extraction module 108 and an object classifier 110. Feature extraction module 108 is representative of functionality to extract local features from an image, further discussion of which may be found in FIG. 2.

Local features correspond to interesting points of an image that can be extracted from the image to provide a feature description of the image. The feature description can be used to locate an object, such as a face, in the image when the image contains many other objects. Feature extraction module 108 can extract any type of local features from an image, using a variety of different image extraction techniques.

In order to perform effective object recognition, it is important that the local features are detectable under changes in image scale, noise, and illumination. Accordingly, in one or more implementations, the local features extracted by features extraction module 108 are scale-invariant feature transform (SIFT) features. SIFT features are resilient to changes in image scale, rotation, noise, illumination, and changes in viewpoint. As described herein, "SIFT" features correspond to local features that are extracted from an image using SIFT extraction techniques. SIFT extraction techniques are known in the art and are not described in any further detail herein.

Object classifier 110 is representative of functionality to classify the extracted features to identify regions of the image that include an object. In one or more implementations, objects include faces of people in an image. Objects, however, can include any type of object in an image. Further discussion of object classifier 110 may also be found in FIG. 2.

In the following discussion, techniques are described in which object detection module 104 utilizes cascaded coarse-to-dense object detection techniques to detect objects in images. In a first stage, coarse features are extracted from an image, and object classifier 110 rejects "non-object" regions of the image which do not include an object. Then, in one or more subsequent stages, dense features are extracted from the remaining "non-rejected" regions of the image. The dense features are used by object classifier 110 to detect one or more objects in the image. Any number of stages may be utilized to detect objects in an image. For example object detection module 104 may utilize two, three, four, or five cascaded stages to detect objects in an image.

Figure 2:
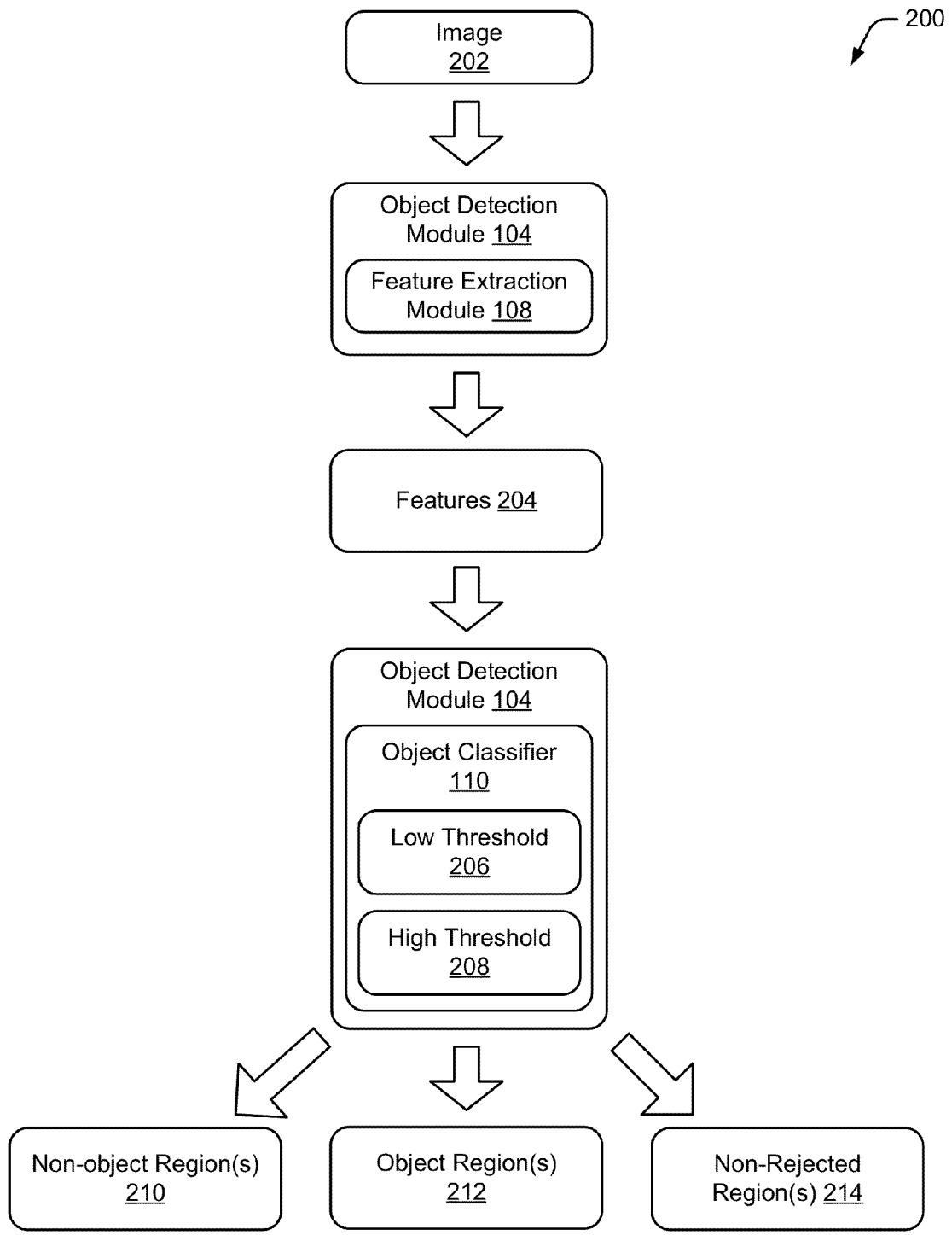
FIG. 2 illustrates a system in an example implementation in which an object detection model is used to detect one or more objects in an image.

FIG. 2 illustrates a system 200 in an example implementation in which object detection module 104 of FIG. 1 is used to detect one or more objects in an image.

In this example, for a first stage of cascaded object detection, an image 202 is received by object detection module 104. Image 202 can include any type of image, and may also include video. Next, feature extraction module 108 extracts features 204 from image 202. The extracted features may include local features, such as scale-invariant feature transform (SIFT) features, or any other type of local feature descriptor.

In the first stage, coarse or sparse features are extracted by feature extraction module 108. Extracting coarse features causes a relatively small number of features to be extracted in the first stage, especially when compared to the number of features extracted in conventional solutions. For example, approximately 1,000 features may be extracted in the first stage, whereas 200,000 or more features may be extracted in conventional solutions. To extract the coarse features, feature extraction module 108 may extract features at a high scale level, or using a small step size.

Figure 3:
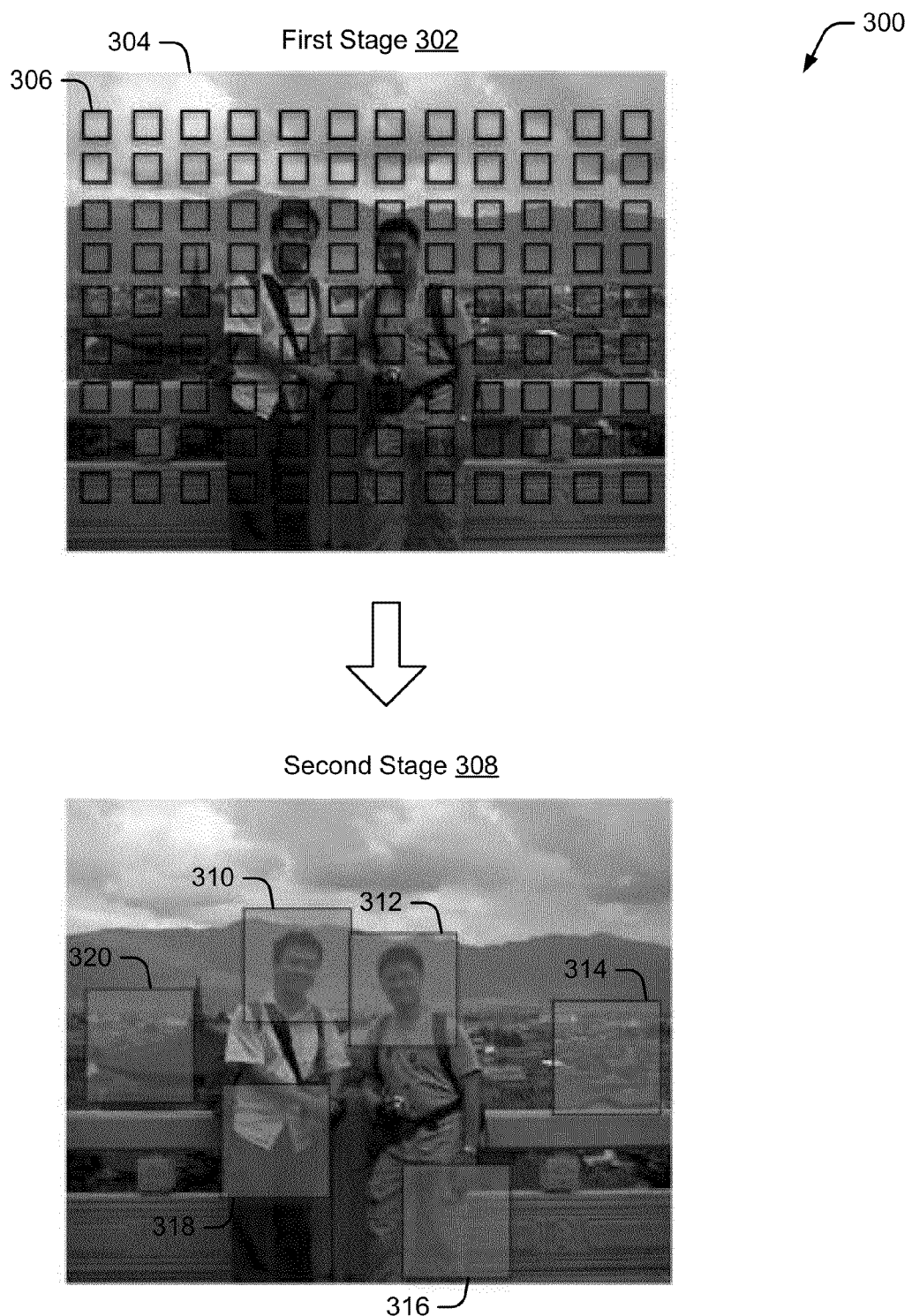
FIG. 3 illustrates an example of a first stage and a second stage of object detection in an image.

Consider, for example, FIG. 3 which illustrates an example 300 of a first stage and a second stage of object detection in an image. At a first stage 302 of cascaded object detection, an image 304 has been divided into multiple regions 306, which are each represented by a box. Feature extraction module 108 is configured to extract coarse or sparse local features from each of these multiple regions 306 to detect objects in image 304. In this example, the objects correspond to two faces of the two people pictured in image 304.

After being extracted, features 204 may be quantized to generate an index value for each extracted feature. In conventional solutions, this quantization process is very slow due to the large number of features extracted. It is to be appreciated, therefore, that extracting a small number of coarse features in the first stage increases the speed and efficiency of the object detection because less features are quantized. In one or more implementations, in the first stage, approximate nearest neighbor (ANN) search parameters of the quantization process are relaxed in order to further increase the speed of the quantization process.

Referring back to FIG. 2, features 204 are passed to object classifier 110 of object detection module 104. Object classifier 110 is configured to identify non-object regions 210 (e.g., regions which do not include an object) based on the extracted features 204. To do so, object classifier 110 computes a confidence score for each region which indicates the confidence that the region includes an object, such as a face. The confidence score is based on the features 204 extracted from the region.

In one or more implementations, object classifier 110 is an exemplar-based face detection classifier that is configured to detect faces in images. It is too be appreciated, however, that object classifier 110 may be implemented as any type of classifier, such as a histogram classifier, a support vector machine (SVM) classifier, or any other machine-running classifier.

Object classifier 110 then compares the confidence score for each region to one or more thresholds. In one or more implementations, the confidence score for each region is compared to a low threshold 206. Object classifier 110 identifies non-object regions 210 of image 202 as those regions with confidence scores less than low threshold 206.

Low threshold 206 can be trained offline, for example using a training set of faces and non-faces. Low threshold 206 is selected so that almost all regions will pass the low threshold as including an object. This ensures that high recall is retained by not eliminating any false positives. In other words, because coarse features are extracted at stage one, the low threshold ensures that regions that may contain a valid object are not eliminated due to limited information. Thus, some regions which do not include a valid object may still pass low threshold 206.

In one or more implementations, object classifier 110 is also configured to identify object regions 212 of image 202, which include an object, based on the extracted features 204. To do so, object classifier 110 compares the confidence score for each region to a high threshold 208. Object classifier 110 then determines object regions 212 of image 202 as those regions with confidence scores greater than high threshold 208. For example, even though coarse or sparse features are extracted in the first stage, in some instances the confidence score for a region is high enough for object classifier 110 to classify the region as an object region 212.

Next, object detection module 104 rejects one or more regions from image 202. The rejected regions may include the non-object regions 210 that do not pass low threshold 206. Alternately or additionally, the rejected regions may include the object regions 212 which pass high threshold 208. As will be described in the "Implementation Example" below, "rejecting" a region refers to rejecting a region from a binary mask of object classifier 110.

In one or more implementations, each pixel within an object region 212 may be rejected because the entire region is treated as an object. For example, if a region is identified as including a face, it is very unlikely that an additional face would also be within this region. Thus, features inside object regions 212 may not be needed for detection of an additional object. Conversely, for the non-object regions 210, a small area of pixels around the center of the non-object region may be rejected because the region may include a portion of an object which may be needed to detect the object in a subsequent stage.

After rejecting regions from image 202, non-rejected regions 214 of image 202 are passed back to feature extraction module 108 to initiate a second stage of cascaded object detection. The non-rejected regions 214 of image 202 correspond to the regions of image 202 which object detection module 104 is unable to classify as non-object regions 210 or object regions 212.

In the second stage of cascaded object detection, feature extraction module 108 extracts features 204 from the non-rejected regions 214 of image 202. For example, in FIG. 3 at a second stage 308 many of regions 306 from first stage 302 have been rejected, and non-rejected regions 310, 312, 314, 316, 318, and 320 remain, as indicated by the boxes around these regions. Extracting features from the non-rejected regions 214 of image 202 increases the speed of the cascaded object detection techniques because features do not need to be extracted from the rejected regions of image 202.

The non-rejected regions 214 may not include an object. For example, in FIG. 3 non-rejected regions 310 and 312 include an object, which in this case is a face. In contrast, non-rejected regions 314, 316, 318, and 320 do not include an object. As described above, some of non-rejected regions 214 may not include an object because low threshold 206 enables regions that do not include a valid object to pass to the next stage to ensure valid objects are not eliminated due to limited information in the first stage.

For the second stage, feature extraction module 108 is configured to extract features 204 that are denser or finer than the coarse features extracted in the first stage. This causes a greater number of features to be extracted in the second stage then were extracted in the first stage. As an example, if approximately 1,000 features are extracted in the first stage, approximately 5,000 features may be extracted in the second stage. To extract denser features, feature extraction module 108 may extract features from a lower scale which is lower than the high scale of the first stage, or the step size may be decreased from the step size used in the first stage.

After extracting features 204 from the non-rejected regions 214 of image 202, the process of determining non-object regions 210, object regions 212, and non-rejected regions 214 may be performed in the same manner as described for the first stage. In some cases, however, low threshold 206 and high threshold 208 may be adjusted. For example, in the second stage, low threshold 206 may be increased.

The non-rejected regions 214 determined for the second stage are then passed back to feature extraction module 108 to initiate a third stage of the cascaded object detection. This cascaded object detection process may go on and on for a given number of stages, or until object detection module 104 determines there are no undetected objects in the image. At each stage, the features 204 that are extracted by feature extraction module 108 are denser than the features 204 extracted in the previous stage.

At a final stage of the given number of stages, object classifier 110 is configured to detect one or more objects in image 202 using the features extracted in the final stage.

Consider now, an implementation example of detecting objects in an image using object classifier 110.

Implementation Example

In one of more implementations, object detection module 104 is configured to receive an image (I) of size (w, h). Then, considering a number of stages, T, and a feature extraction parameter sequence of $P_1, P_2, \ldots, P_T$, object detection module 104 detects objects in the image using the following equation:

$$P_t = (step_t, scale_t, threshold_t)$$

In this equation, the larger $step_t$ causes coarser features to be extracted, and the large scaler is the smaller size to which I is downscaled. The parameter $threshold_t$ corresponds to low threshold 206 (FIG. 2), and is how confident a candidate detection should be in order to be passed to a next cascade stage. The threshold parameter $threshold_t$ may be different for each cascade stage. For example, in the first stage, the low threshold parameter may be lower than the low threshold parameter in the second stage.

In this equation, $step_i > step_j$, $scale_i > scale_j$, and $\forall \{i,j | i<j\}$.

For the cascaded object detection, object detection module 104 prepares a binary mask corresponding to the size (w, h) of image I and initializes each point on the binary mask to positive.

For all $t=1, \ldots, T$, object classifier 110 performs the following recursive function:

(1) Extract features from points of image I which have a corresponding positive point on the binary mask, with parameter set $P_t$.

(2) Apply object classifier 110 to the extracted features to determine confidence scores for each region of the image: $D1, \ldots, D_N$, where $n=1, \ldots N$ is a region of the image.

(3) Reset each point on the binary mask to negative, check the confidence score of each region one by one, for each region with a confidence score greater than the low threshold parameter, set the corresponding region on the binary mask to positive.

Then, object detection module 104 repeats steps (1), (2), and (3) for a given number of cascaded stages.

For a final stage of the given number of cascaded stages, object detection module 104 detects one or more objects in the image based on the extracted features in the final stage.

Example Procedure

The following discussion describes object detection techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 4:
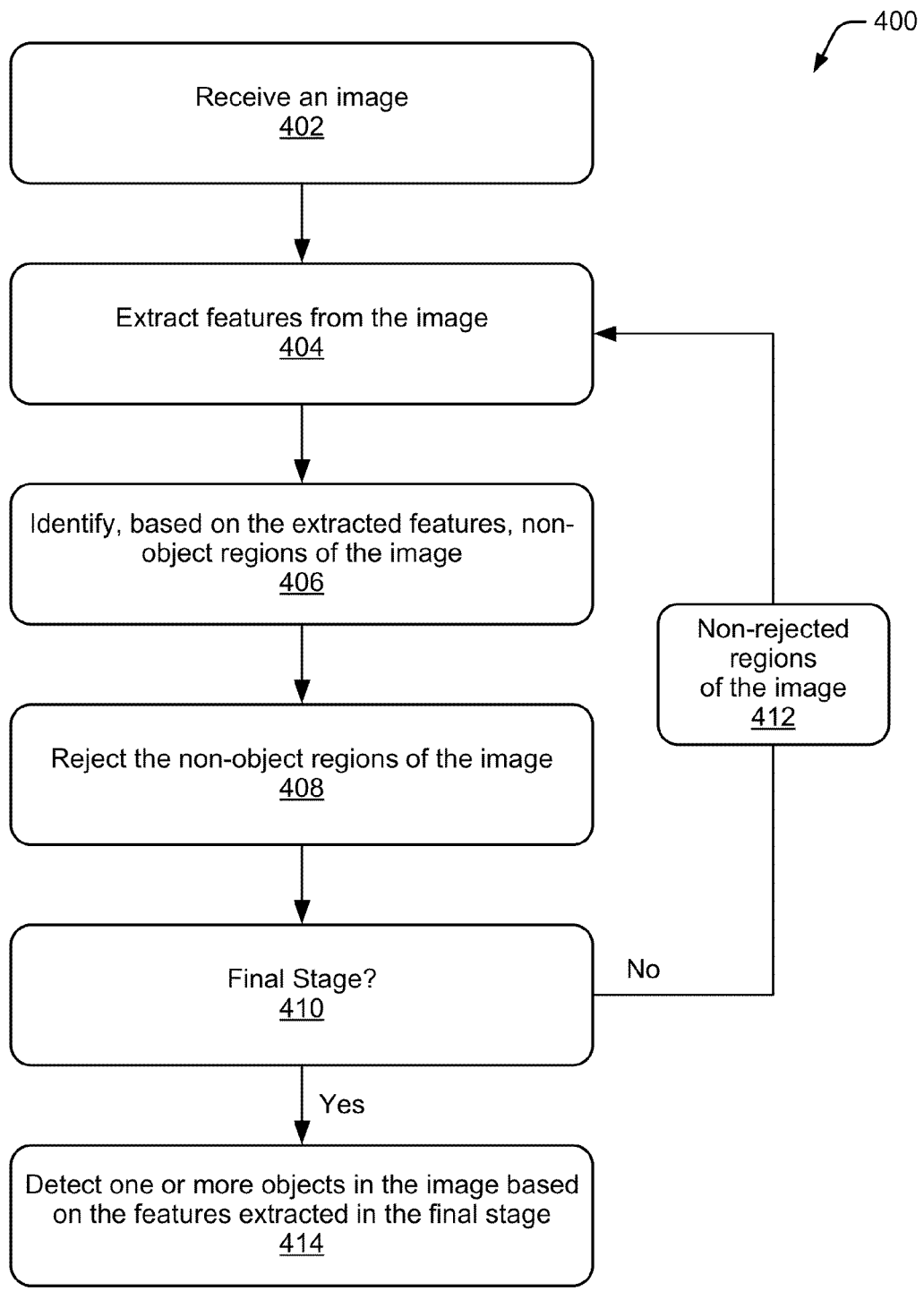
FIG. 4 illustrates a procedure in an example implementation in which an object detection module is used to detect one or more objects in an image.

FIG. 4 illustrates a procedure 400 in an example implementation in which an object detection module is used to detect one or more objects in an image.

At 402, an image is received. For example, object detection module 104 (FIG. 1) receives an image 202 (FIG. 2).

At 404, features are extracted from the image. For example, feature extraction module 108 extracts features 204 from image 202. For a first stage, the extracted features may be coarse features.

At 406, non-object regions of the image are identified based on the extracted features. For example, object classifier 110 identifies non-object regions 210 of image 202 based on the extracted features 204. In one of more implementations, to identify the non-object regions 210 of image 202, object classifier 110 computes a confidence score for each region that indicates a confidence that the region includes an object, and compares the confidence score for each region to a low threshold 206. Object classifier 110 then identifies regions with confidence scores that are less than low threshold 206 as the non-object regions 210.

In one or more implementations, object classifier 110 can also identify object regions 212 of image 202 by comparing the confidence score for each region to high threshold 208. Object classifier 110 then identifies regions with confidence scores that are greater than high threshold 208 as the object regions 212 of image 202.

At 408, the non-object regions of the image are rejected. For example, object classifier 110 rejects non-object regions 210 from image 202. In some implementations, if object regions 212 are identified, object classifier 110 may also reject the object regions 212 from image 202.

At 410, object detection module 104 determines whether a final stage of a given number of stages of the cascaded object detection has been reached. If the final stage has not been reached, then at 412 the non-rejected regions of the image are passed back to feature extraction module 108.

Feature extraction module 108 is configured to perform steps 404, 406, and 408 using the non-rejected regions of the image for one or more subsequent stages until the final stage is reached. The features extracted in each of the one or more subsequent stages are denser than features extracted in a previous stage.

When the final stage is reached, at 414 one or more objects in the image are detected based on the features extracted in the final stage. For example, object classifier 110 detects one or more objects in the image 202 based on the features 204 extracted in the final stage.

Having described example procedures in accordance with one or more implementations, consider now an example system and device that can be utilized to implement the various techniques described herein.

Example System and Device

Figure 5:
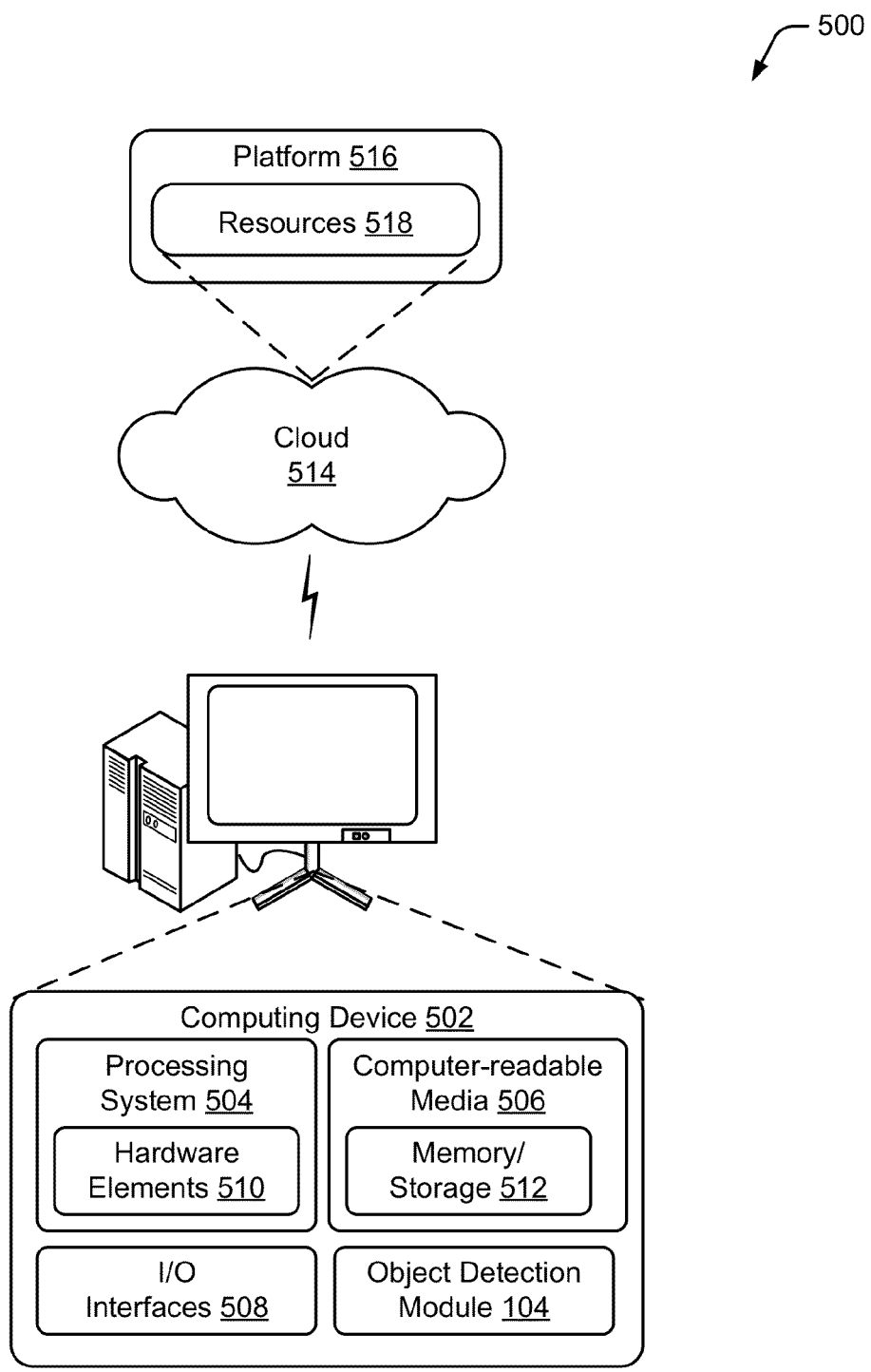
FIG. 5 illustrates an example system including various components of an example device that can be implemented as any type of computing device as described and/or utilized with reference to FIGS. 1-4 to implement embodiments of the techniques described herein.

FIG. 5 illustrates an example system generally at 500 that includes an example computing device 502 that is representative of one or more computing systems and/or devices that may implement the various techniques described herein. This is illustrated through inclusion of object detection module 104, which operates as described above. The computing device 502 may be, for example, a server of a service provider, a device associated with a client (e.g., a client device), an on-chip system, and/or any other suitable computing device or computing system.

The example computing device 502 is illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media.

The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device implementation, implementation of functionality described herein may be distributed throughout the system 500. For example, the functionality may be implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
receiving an image;
for a first stage:
   extracting, by a processor, coarse features from the image;
   identifying, by the processor, non-object regions of the image which do not include an object by: computing a confidence score for each region based on the extracted coarse features, comparing the confidence score for each region to a first threshold, and identifying regions with confidence scores that are less than the first threshold as the non-object regions of the image;
   rejecting the non-object regions of the image;
for one or more subsequent stages:
   extracting, by the processor, dense features from non-rejected regions of the image;
   identifying, by the processor, additional non-object regions of the image by computing an additional confidence score for each additional region based on the extracted dense features, comparing the additional confidence score for each additional region to a second threshold, and identifying additional regions with confidence scores that are less than the second threshold as the additional non-object regions of the image, wherein the first threshold is lower than the second threshold;
   rejecting the additional non-object regions of the image;
for a final stage of the one or more subsequent stages, detecting one or more objects in the image based on features extracted in the final stage.

2. The computer-implemented method of claim 1, further comprising, for the first stage and the one or more subsequent stages, identifying, based on the extracted features, object regions of the image which include the object.

3. The computer-implemented method of claim 2, wherein the identifying the object regions of the image further comprises:
   computing a confidence score for each region that indicates a confidence that the region includes the object;
   comparing the confidence score for each region to a high threshold; and
   identifying regions with confidence scores that are greater than the high threshold as the object regions of the image.

4. The computer-implemented method of claim 3, further comprising, for the first stage and the one or more subsequent stages, rejecting the object regions of the image.

5. The computer-implemented method of claim 1, further comprising responsive to extracting the coarse features from the image in the first stage, quantizing the features, using relaxed approximate nearest neighbor (ANN) search parameters, to generate an index value for each extracted coarse feature.

6. The computer-implemented method of claim 1, wherein the features extracted in the first stage comprise high scale features, and wherein the features extracted in the one or more subsequent stages comprise lower scale features than the high scale features extracted in the first stage.

7. The computer-implemented method of claim 1, wherein a number of the features extracted in the first stage is less than a number of the features extracted in a second stage.

8. The computer-implemented method of claim 1, wherein the extracted coarse features and the extracted dense features comprise scale-invariant feature transform (SIFT) features.

9. The computer-implemented method of claim 1, wherein the object comprises a face.

10. A computing device comprising:
    at least a memory and a processor to implement an object detection module, the object detection module configured to;
    in a first stage, extract coarse features from an image, identify non-object regions of the image which do not include an object based on the extracted coarse features, and reject the non-object regions of the image; and
    for one or more subsequent stages, extract dense features from non-rejected regions of the image, identify additional non-object regions of the image based on the extracted dense features, reject the additional non-object regions of the image;
    for a final stage of the one or more subsequent stages, detect one or more objects in the image based on features extracted in the final stage;
    wherein the object detection module is configured to identify the non-object regions of the image, in the first stage by: computing a confidence score for each region based on the extracted coarse features, comparing the confidence score for each region to a first threshold, and identifying regions with confidence scores that are less than the first threshold as the non-object regions of the image; and
    wherein the object detection module is configured to identify the additional non-object regions of the image, for the one or more subsequent stages, by: computing an additional confidence score for each additional region based on the extracted dense features, comparing the additional confidence score for each additional region to a second threshold, and identifying additional regions with confidence scores that are less than the second threshold as the additional non-object regions of the image, wherein the first threshold is lower than the second threshold.

11. The computing device of claim 10, further comprising, for the first stage and the one or more subsequent stages, identifying, based on the extracted features, object regions of the image which include the object.

12. The computing device of claim 11, wherein the identifying the object regions of the image further comprises:
    computing a confidence score for each region that indicates a confidence that the region includes the object;
    comparing the confidence score for each region to a high threshold; and
    identifying regions with confidence scores that are greater than the high threshold as the object regions of the image.

13. The computing device of claim 12, further comprising, for the first stage and the one or more subsequent stages, rejecting the object regions of the image.

14. The computing device of claim 10, further comprising responsive to extracting the coarse features from the image in the first stage, quantizing the features, using relaxed approximate nearest neighbor (ANN) search parameters, to generate an index value for each extracted coarse feature.

15. The computing device of claim 10, wherein the features extracted in the first stage comprise high scale features, and wherein the features extracted in the one or more subsequent stages comprise lower scale features than the high scale features extracted in the first stage.

16. The computing device of claim 10, wherein a number of the features extracted in the first stage is less than a number of the features extracted in a second stage.

17. The computing device of claim 10, wherein the extracted coarse features and the extracted dense features comprise scale-invariant feature transform (SIFT) features.

18. The computing device of claim 10, wherein the object comprises a face.

19. The computing device of claim 10, wherein the object detection module is configured to utilize an exemplar-based face detection classifier to detect the one or more objects.

20. The computing device of claim 10, wherein the coarse features and the dense features comprise local features of the image.

* * * * *